(12) United States Patent
Ding et al.

(10) Patent No.: US 9,661,175 B2
(45) Date of Patent: May 23, 2017

(54) ADAPTIVE SCANNING DEVICE

(71) Applicant: GRG Banking Equipment Co., Ltd., Guangzhou, Guangdong (CN)

(72) Inventors: Yingfeng Ding, Guangdong (CN); Hexiang Huang, Guangdong (CN); Changhai Wu, Guangdong (CN); Guocheng Shi, Guangdong (CN); Yonghuan Yang, Guangdong (CN)

(73) Assignee: GRG Banking Equipment Co., Ltd., Guangzhou, Guangdong (CN)

( * ) Notice: Subject to any disclaimer, the term of this patent is extended or adjusted under 35 U.S.C. 154(b) by 0 days.

(21) Appl. No.: 15/034,308

(22) PCT Filed: Nov. 21, 2014

(86) PCT No.: PCT/CN2014/091858
§ 371 (c)(1),
(2) Date: May 4, 2016

(87) PCT Pub. No.: WO2016/000391
PCT Pub. Date: Jan. 7, 2016

(65) Prior Publication Data
US 2016/0269584 A1    Sep. 15, 2016

(30) Foreign Application Priority Data
Jun. 30, 2014    (CN) .......................... 2014 1 0309869

(51) Int. Cl.
*H04N 1/04* (2006.01)
*H04N 1/00* (2006.01)

(52) U.S. Cl.
CPC ........... *H04N 1/04* (2013.01); *H04N 1/00554* (2013.01); *H04N 2201/0081* (2013.01)

(58) Field of Classification Search
None
See application file for complete search history.

(56) References Cited

U.S. PATENT DOCUMENTS 8,040,575 B2 * 10/2011 Eom .................. H04N 1/00326
235/380
2005/0254103 A1    11/2005 Sugiyama et al.
(Continued)

FOREIGN PATENT DOCUMENTS

| CN | 101296284 A | 10/2008 |
| CN | 102674036 A | 9/2012 |

(Continued)

OTHER PUBLICATIONS

Chinese First Office Action for CN201410309869.4, mailed May 20, 2016.
(Continued)

*Primary Examiner* — Barbara Reinier
(74) *Attorney, Agent, or Firm* — Yue Xu; U.S. Fairsky LLP

(57) ABSTRACT

An adaptive scanning device, used to meet requirements for scanning and recognizing different scanned media and to save time and scanning costs. The adaptive scanning device in an embodiment of the present invention includes: a left side plate, a right side plate, an extension spring, an upper floating channel assembly, an image scanning tube B, a lower channel plate, a card information reading assembly, a document information reading assembly, friction wheels and a shaft sleeve. The upper floating channel assembly specifically includes: an image scanning tube A, an upper channel plate, an upper channel fixed shaft and fixed bearings.

10 Claims, 9 Drawing Sheets

(56) References Cited

U.S. PATENT DOCUMENTS

| | | |
|---|---|---|
| 2007/0095917 A1 | 5/2007 | van Os |
| 2008/0266616 A1 | 10/2008 | Momose |
| 2011/0128596 A1 | 6/2011 | Tonooka et al. |
| 2012/0234655 A1 | 9/2012 | Dong et al. |

FOREIGN PATENT DOCUMENTS

| | | |
|---|---|---|
| CN | 202907038 U | 4/2013 |
| CN | 104092844 A | 10/2014 |
| JP | 2003222955 A | 8/2003 |
| JP | 2010079067 A | 4/2010 |
| JP | 2011211654 A | 10/2011 |

OTHER PUBLICATIONS

International Search Report for PCT/CN2014/091858, mailed Mar. 25, 2015, ISA/CN.
European Search Report for 14896897.7-1903, mailed Mar. 16, 2017.

\* cited by examiner

ADAPTIVE SCANNING DEVICE

This application is the national phase of International Application No. PCT/CN2014/091858, titled "ADAPTIVE SCANNING DEVICE", filed on Nov. 21, 2014, which claims the benefit of priority to Chinese Patent Application No. 201410309869.4 titled "SELF-ADAPTIVE SCANNING DEVICE", filed with the Chinese State Intellectual Property Office on Jun. 30, 2014, the entire disclosure of which application is incorporated herein by reference.

FIELD

The present application relates to the field of electronic devices, and more particularly to a self-adaptive scanning device.

BACKGROUND

In people's daily life, a scanned document or a retained image is usually required to be used as a proof of identity or a qualification certificate. For example, an identification card is required to be scanned during the application for a bank card, a household registry certificate is required to be scanned during the marriage registration, and a passport is required to be scanned during the application for entry and exit, etc. All of these scanning operations cannot be performed without a scanner.

Currently, there are various kinds of scanners, for example drum scanners, flatbed scanners, pen scanners, and business card scanners, etc. These scanners each have their own unique advantages, for example, the flatbed scanners may conveniently and quickly scan the surface of the paper, the pen scanners are portable and are not restricted by the size and surface smoothness of a scanned media, while the business card scanners can perform full range scanning to a business card rapidly.

However, these kinds of scanners do not have enough versatile functions, and fail to be adaptive to various different scanned media. When various kinds of media are simultaneously required to be scanned, for example, when the scanned media with different thicknesses and properties, such as a paper document, an identification card, a passport and a card, are required to be scanned, several kinds of scanners are usually required to be employed to meet the requirements, thus not only wastes time, but also increases the scanning cost.

SUMMARY

A self-adaptive scanning device is provided according to the present application, which can meet the requirements for scanning and recognizing various different scanned media, thus saves time and the scanning cost.

The self-adaptive scanning device according to the present application, includes:
 a left side plate, a right side plate, a tension spring, a upper floating passage assembly, an image scanning tube B, a lower passage plate, a card-type information reading assembly, a certificate information reading assembly, friction wheels, and shaft sleeves;
 the upper floating passage assembly includes an image scanning tube A, an upper passage plate, an upper passage fixed shaft, and fixed bearings;
 the upper passage fixed shaft is fixed to the upper passage plate, and is mounted between the left side plat and the right side plate;
 the left side plate and the right side plate are each provided with a guide slot, and each of the shaft sleeves is movably mounted in a respective guide slot and slides upward and downward in the respective guide slot, and two ends of the upper passage fixed shaft are fixed to the shaft sleeves respectively;
 a plurality of fixed bearings are mounted on the upper passage plate, and a plurality of friction wheels are mounted on the lower passage plate, and the fixed bearings and the friction wheels are mounted in pairs;
 a scanning passage between the upper passage plate and the lower passage plate is formed;
 the image scanning tube A is mounted above the scanning passage, and the image scanning tube B is mounted below the scanning passage;
 the tension spring has one end fixed to the upper passage fixed shaft, and another end fixed to the left side plate or the right side plate;
 the card-type information reading assembly is mounted to the upper passage plate or the lower passage plate, and is configured to read a built-in card information of a card type scanned medium in the scanning passage; and
 the certificate information reading assembly is mounted to the upper passage plate or the lower passage plate, and is configured to read a built-in certificate information of a certificate type scanned medium in the scanning passage.

Optionally, the self-adaptive scanning device further includes a reversing mechanism;
 the reversing mechanism includes a rotational electromagnet, a coupling, a reversing spindle, and a reversing component;
 the rotational electromagnet and the reversing spindle are fixedly connected together by the coupling;
 the rotational electromagnet is mounted on the left side plate or the right side plate; and
 the reversing component is fixedly mounted on the reversing spindle.

Optionally, the reversing component is rotated by the rotation of the rotational electromagnet, and the reversing component, after being rotated to move upward, engages a vacant slot mated with the reversing component in the upper passage plate, and a joining passage is formed between the reversing component and the lower passage plate; and
 after the reversing component is rotated to move downward, a front end thereof abuts against the lower passage plate, in such a case, a recovering passage is formed between the reversing component and the upper passage plate.

Optionally, the self-adaptive scanning device further includes a plurality of transmission shafts passing through axes of the friction wheels respectively and mounted between the left side plate and the right side plate, with each being configured to drive the friction wheels on the drive shaft to jointly rotate.

Optionally, the self-adaptive scanning device further includes:
 a driving wheel fixedly mounted at one end of each of the transmission shafts and located on an outer side of the left side plate or the right side plate;
 a caterpillar band, mounted on the plurality of transmission wheels, and configured to drive the driving wheels to synchronously rotate; and
 a driving motor; mounted to the left side plate or the right side plate, the driving motor is provided with output wheels, the output wheels are connected to the drive wheels by the caterpillar band, and the driving motor drives the plurality of drive wheels via the output wheels and the caterpillar band to rotate.

Optionally, the self-adaptive scanning device further includes: an upper cover of housing and a lower cover of housing matching with the upper cover of housing;

the upper cover of housing and the lower cover of housing are movably connected via a hinge; and the self-adaptive scanning device is housed by the upper cover of housing and the lower cover of housing together.

Optionally, the self-adaptive scanning device further includes: a recovery box; the recovery box is mounted to an exit of the recovering passage; and is configured to recover the scanned medium coming out from the recovering passage.

Optionally, when the scanned medium enters into the scanning passage, the upper passage plate slides to move upward under the action of a supporting force of the scanned medium, and the scanned medium can enter into the scanning passage; and the upper passage plate slides downward under the action of a restoring force provided by the tension spring, to closely fit the scanned medium, to allow a sensing surface of the image scanning tube A on the upper passage plate and a sensing surface of the image scanning tube B on the lower passage plate to fit an upper surface and a lower surface of the scanned medium.

Optionally, the scanned medium, after entering via an entrance of the scanning passage, may pass through the scanning passage to enter into the recovering passage, and finally enters into the recovery box via the exit of the recovering passage, during this period, the image scanning tube A scans the scanned medium, or the image scanning tube B scans the scanned medium, or the card-type information reading assembly reads related information of the scanned medium, or, the certificate information reading assembly reads related information of the scanned medium.

Optionally, when the scanned medium enters via an entrance of the joining passage, the reversing mechanism moves upward, and the scanned medium may pass through the joining passage to enter into the scanning passage, and finally comes out from the entrance of the scanning passage.

According to the above technical solutions, the embodiments according to the present application have the following advantages.

In the embodiments of the present application, the self-adaptive scanning device includes: the left side plate, the right side plate, the tension spring, the upper floating passage assembly, the image scanning tube B, the lower passage plate, the card-type information reading assembly, the certificate information reading assembly, the friction wheels, and the shaft sleeves. The upper floating passage assembly specifically includes: the image scanning tube A, the upper passage plate, the upper passage fixed shaft, and the fixed bearings. The upper passage fixed shaft is fixed to the upper passage plate, and is mounted between the left side plat and the right side plate. The left side plate and the right side plate are each provided with the guide slot, and each of the shaft sleeves is movably mounted in a respective guide slot and slides upward and downward along the respective guide slot, and two ends of the upper passage fixed shaft are fixed to the shaft sleeves. Several fixed bearings are mounted on the upper passage plate, and several friction wheels are mounted on the lower passage plate, and the fixed bearings and the friction wheels are mounted in pairs. The scanning passage is formed between the upper passage plate and the lower passage plate. The image scanning tube A is mounted above the scanning passage, and the image scanning tube B is mounted below the scanning passage. The tension spring has one end fixed to the upper passage fixed shaft, and has another end fixed to the left side plate or the right side plate. The card-type information reading assembly is mounted to the upper passage plate or the lower passage plate, and is configured to read the built-in card information of the card type scanned medium in the scanning passage. The certificate information reading assembly is mounted to the upper passage plate or the lower passage plate, and is configured to read the built-in certificate information of the certificate type scanned medium in the scanning passage. In this embodiment, the upper passage plate is slidable upward and downward in the guide slots via the upper passage fixed shaft, thus changing a distance between the upper passage plate and the lower passage plate, i.e., changing a size of the scanning passage, and in addition, each of two ends of the upper passage fixed shaft is provided with the tension spring to provide a restoring force, therefore the scanning passage may adaptively change the size of the scanning passage according to a thickness of the scanned medium entered, and the operations such as scanning the scanned medium, retaining its image, reading and recognizing its information may be performed by the image scanning tube A, the image scanning tube B, the card-type information reading assembly and the certificate information reading assembly, thus may meet requirement of scanning and recognizing various different scanned media by the same self-adaptive scanning device, and save time and scanning costs.

DETAILED DESCRIPTION

It is provided according to the present application a self-adaptive scanning device, configured to scan and recognize various different scanned media, which saves time and the scanning cost.

For making the objects, features and advantages of the present application clearer and easier to be understood, the technical solutions according to the present application are described in detail hereinafter in conjunction with the drawings in the embodiments of the present application. Apparently, the embodiments described hereinafter are only a part of the embodiments of the present application, rather than all embodiments. Based on the embodiments in the present application, all of other embodiments, made by those skilled in the art without any creative efforts, fall into the scope of the present application.

Figure 16:
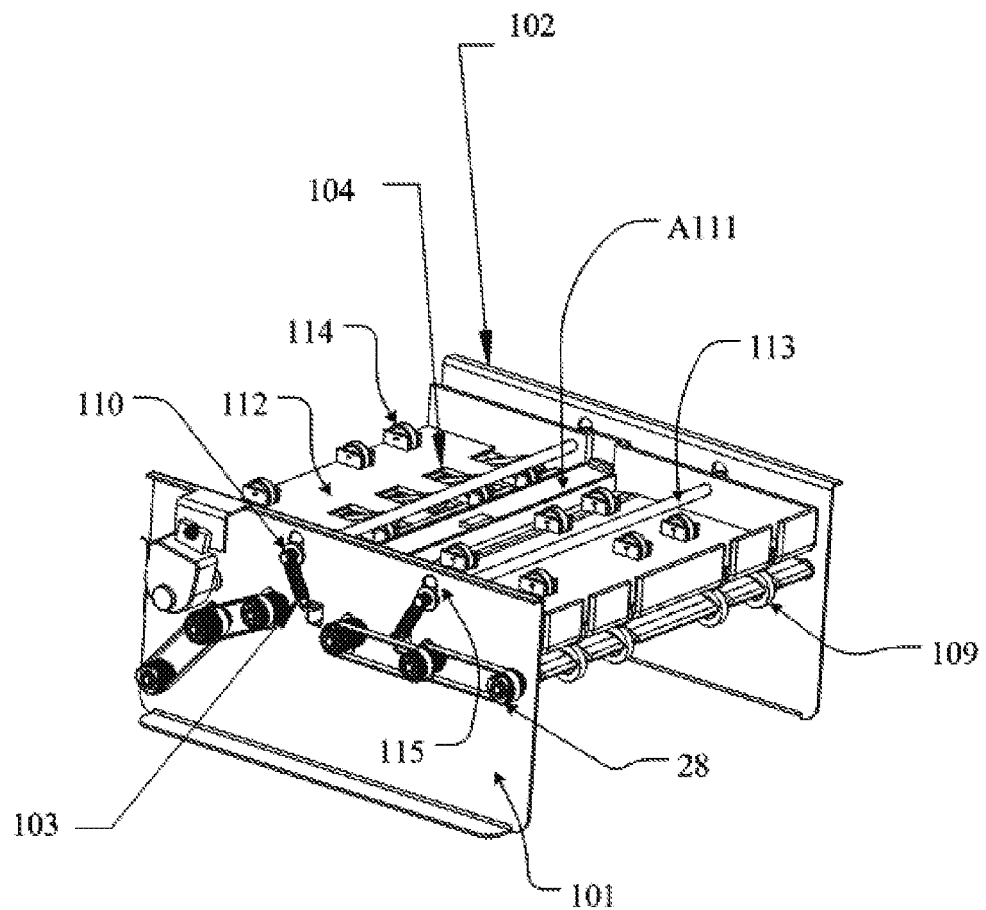
FIG. 16 is a schematic view showing the structure of an embodiment of the self-adaptive scanning device according to the present application.
Figure 17:
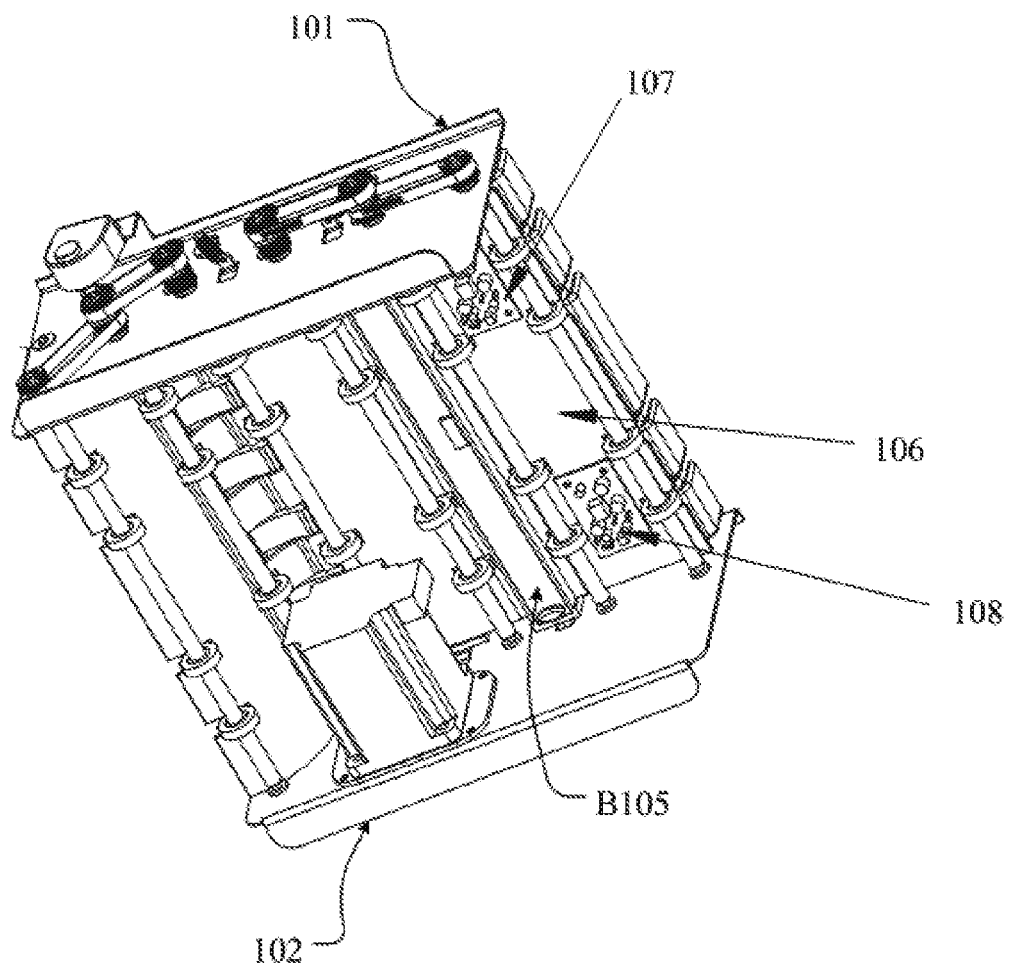
FIG. 17 is a schematic view showing the structure of the embodiment of the self-adaptive scanning device in FIG. 16 from another angle of view.

Referring to FIGS. 16, 17, an embodiment of the self-adaptive scanning device according to the present application includes:

a left side plate 101, a right side plate 102, a tension spring 103, an upper floating passage assembly 104, an image scanning tube B105, a lower passage plate 106, a card-type information reading assembly 107, a certificate information reading assembly 108, friction wheels 109, and shaft sleeves 110.

The upper floating passage assembly 104 specifically includes: an image scanning tube A111, an upper passage plate 112, an upper passage fixed shaft 113, and fixed bearings 114.

The upper passage fixed shaft 113 is fixed to the upper passage plate 112, and is mounted between the left side plat 101 and the right side plate 102.

The left side plate 101 and the right side plate 102 are each provided with a guide slot 115, and the shaft sleeves 110 are movably mounted in the guide slot 115 and slide upward and downward in the guide slot 115, and two ends of the upper passage fixed shaft 113 are fixed to the shaft sleeves 110 respectively.

A plurality of fixed bearings 114 are mounted on the upper passage plate 112, a plurality of friction wheels 109 are mounted on the lower passage plate 106, and the fixed bearings 114 and the friction wheels 109 are matched.

A scanning passage is formed between the upper passage plate 112 and the lower passage plate 106.

The image scanning tube A111 is mounted above the scanning passage, and the image scanning tube B105 is mounted below the scanning passage.

The tension spring 103 has one end fixed to the upper passage fixed shaft 113, and another end fixed to the left side plate 101 or the right side plate 102.

The card-type information reading assembly 107 is mounted on the upper passage plate 112 or the lower passage plate 106, and is configured to read a built-in card information of a card type scanned medium in the scanning passage.

The certificate information reading assembly 108 is mounted on the upper passage plate 112 or the lower passage plate 106, and is configured to read a built-in certificate information of a certificate type scanned medium in the scanning passage.

In this embodiment, the self-adaptive scanning device includes: the left side plate 101, the right side plate 102, the tension spring 103, the upper floating passage assembly 104, the image scanning tube B105, the lower passage plate 106, the card-type information reading assembly 107, the certificate information reading assembly 108, the friction wheels 109, and the shaft sleeves 110. The upper floating passage assembly 104 specifically includes: the image scanning tube A111, the upper passage plate 112, the upper passage fixed shaft 113, and the fixed bearings 114. The upper passage fixed shaft 113 is fixed to the upper passage plate 112, and is mounted between the left side plat 101 and the right side plate 102. The left side plate 101 and the right side plate 102 are each provided with the guide slot 115, and the shaft sleeves 110 are movably mounted in the guide slot 115 and slide upward and downward in the guide slot 115, and two ends of the upper passage fixed shaft 113 are fixed to the shaft sleeves 110 respectively. The plurality of fixed bearings 114 are mounted on the upper passage plate 112, the plurality of friction wheels 109 are mounted on the lower passage plate 106, and the fixed bearings 114 and the friction wheels 109 are matched. The scanning passage is formed between the upper passage plate 112 and the lower passage plate 106. The image scanning tube A111 is mounted above the scanning passage, and the image scanning tube B105 is mounted below the scanning passage. The tension spring 103 has one end fixed to the upper passage fixed shaft 113, and another end fixed to the left side plate 101 or the right side plate 102. The card-type information reading assembly 107 is mounted on the upper passage plate 112 or the lower passage plate 106, and is configured to read the built-in card information of the card type scanned medium in the scanning passage. The certificate information reading assembly 108 is mounted on the upper passage plate 112 or the lower passage plate 106, and is configured to read the built-in certificate information of the certificate type scanned medium in the scanning passage. In this embodiment, the upper passage plate 112 is slidable upward and downward in the guide slots 115 via the upper passage fixed shaft 113, thus changing a distance between the upper passage plate 112 and the lower passage plate 106, thus may change a size of the scanning passage. In addition, two ends of the upper passage fixed shaft 113 are each provided with the tension spring 103 to provide a restoring force, therefore the scanning passage may adaptively change the size of the scanning passage according to a thickness of the scanned medium entered, and the operations such as scanning the scanned medium, image retaining, information reading and recognizing may be performed by the image scanning tube A111, the image scanning tube B105, the card-type information reading assembly 107 and the certificate information reading assembly 108, thus may meet requirements for scanning and recognizing various different scanned media by the same self-adaptive scanning device, which saves time and the scanning cost.

For facilitating understanding, a self-adaptive scanning device according to an embodiment of the present application is described in detail hereinafter. Referring to FIGS. 1 to 15, another embodiment of the self-adaptive scanning device according to the present application includes:

an upper cover of housing 1, a lower cover of housing 2, a hinge 3, a recovery box 4, a left side plate 5, a tension spring 6, a rotational electromagnet 7, an upper floating passage assembly 8, a right side plate 9, a card-type information reading assembly 10, a lower passage plate 11, a certificate information reading assembly 12, a reversing mechanism 13, a driving motor 14, a joining passage 15, a recovering passage 16, an image scanning tube A17, an image scanning tube B18, shaft sleeves 19, an upper passage fixed shaft 20, fixed bearings 21, friction wheels 22, an upper passage plate 23, a coupling 24, a reversing spindle 25, a reversing component 26, a transmission shaft 27, a driving wheel 28 and a caterpillar band 29.

Specifically, the upper floating passage assembly 8 includes the image scanning tube A17, the upper passage fixed shaft 20, the fixed bearings 21, the upper passage plate 23. The reversing mechanism 13 includes the rotational electromagnet 7, the coupling 24, the reversing spindle 25, and the reversing component 26.

Figure 7:
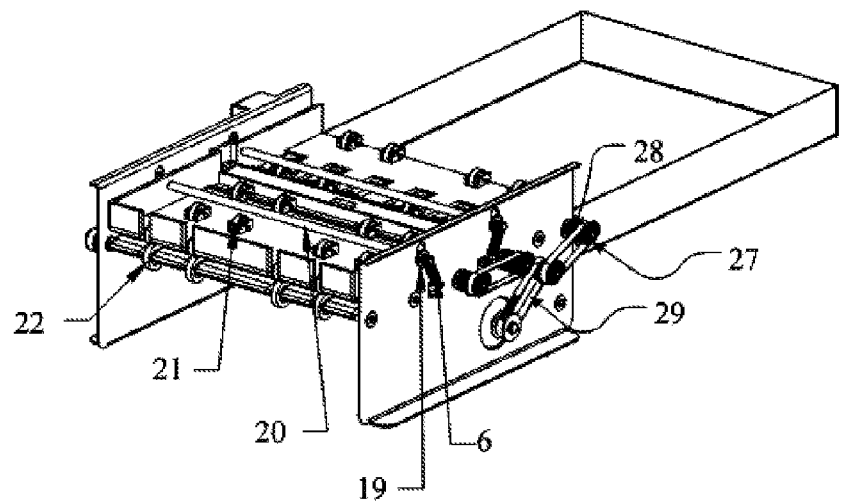
Figure 8:
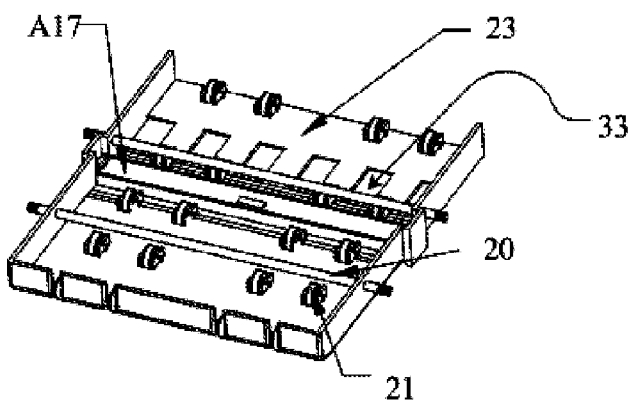
FIG. 8 is a schematic view showing the structure of an upper floating passage assembly in the self-adaptive scanning device.
Figure 11:
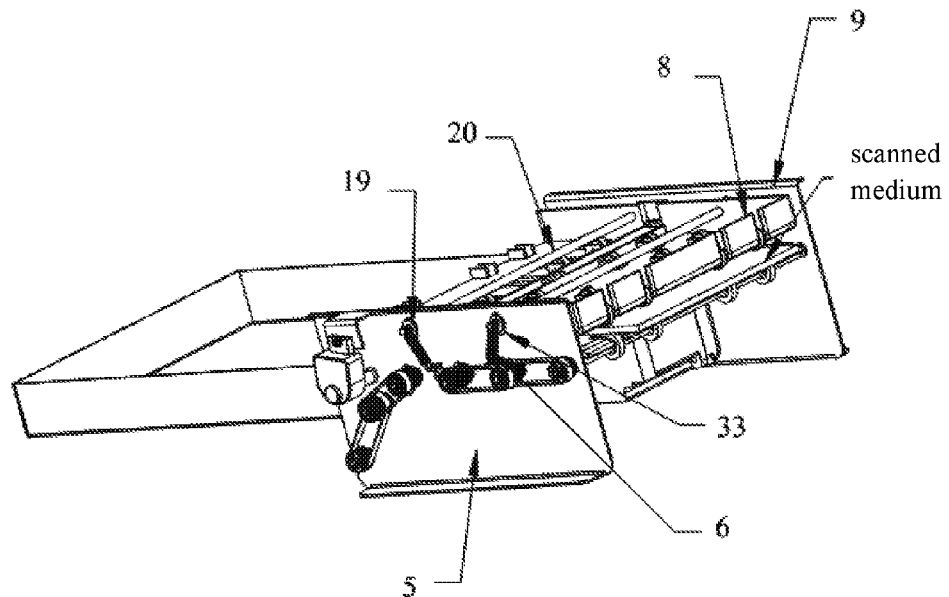
FIG. 11 is a schematic view showing the operation of the upper floating passage assembly of the self-adaptive scanning device.

As shown in FIGS. 7 and 8, the upper passage fixed shaft 20 is fixed to the upper passage plate 23, and the shaft sleeves 19 are sleeved on the upper passage fixed shaft 20. As shown in FIG. 11, the shaft sleeves 19 are slidable upward and downward in a guide slot 33 of the left side plate 5 and a guide slot 33 of the right side plate 9 respectively, and the tension spring 6 has one end fixed to the upper passage fixed shaft 20, and another end fixed to the left side plate 5 or the right side plate 9. As shown in FIG. 11, in the case that the scanned media with different thicknesses enter into the passage, the upper passage plate 23 of the upper floating passage assembly 8 may bring the upper passage fixed shaft 20 and the shaft sleeves 19 to slide upward in the guide slot 33 of the left side plate 5 and the guide slot 33 of the right side plate 9, and at this moment, the tension spring 6 may provide a downward recovering force to the upper floating passage assembly 8, thus enabling a scanning passage 34 to be adaptively adjusted to be applicable to the scanned media with different thicknesses, thereby achieving a self-adaptive function for the scanned media with different thicknesses.

As shown in FIGS. 1, 2, 5, 6, and 12, the recovery box 4, the upper floating passage assembly 8, the card-type information reading assembly 10, the certificate information reading assembly 11, the lower passage plate 11, the reversing mechanism 13, the recovering passage 16, the image scanning tube A17, and the image scanning tube B18 constitute a paper feeding, scanning and recovering passage of the self-adaptive scanning device, which may be adapted to the scanned media which are required to be recovered and have different thicknesses, such as a check, a piece of ordinary A4 paper, a deposit receipt, a second generation of identification card, a passbook, a passport, a household registry certificate, a property ownership certificate and the like, these media enter via an entrance of the scanning passage 34, and then the built-in information of the media may be read by the card-type information reading assembly 10, or the certificate information reading assembly 11, the image of a single side or double sides may be scanned and the information of a single side or double sides may be acquired in the passage by the image scanning tube A17, and the image scanning tube B18, and then the media to be recovered are conveyed into the recovery box 4 via an exit 31 of the recovering passage.

As shown in FIGS. 1, 2, 5, 6, and 15, the upper floating passage assembly 8, the lower passage plate 11, the reversing mechanism 13, the joining passage 15, the image scanning tube A17, and the image scanning tube B18 constitute a conveying passage for a printed medium delivered of the self-adaptive scanning device. An entrance of the joining passage 15 may be connected to a paper exit of a printer, and when the printer delivers out a printed paper, the printed paper enters via the entrance of the joining passage 15, and in the joining passage 15, the printed paper enters into the scanning passage 34 through the reversing mechanism 13, and then the image of a single side or double sides of the printed paper can be scanned and the information of a single side or double sides of the printing paper can be acquired by the image scanning tube A17 and the image scanning tube B18, and then the printed paper is returned to the customer via the entrance of the scanning passage 34.

The connection relationship between the components in the self-adaptive scanning device is as follows.

Figure 9:
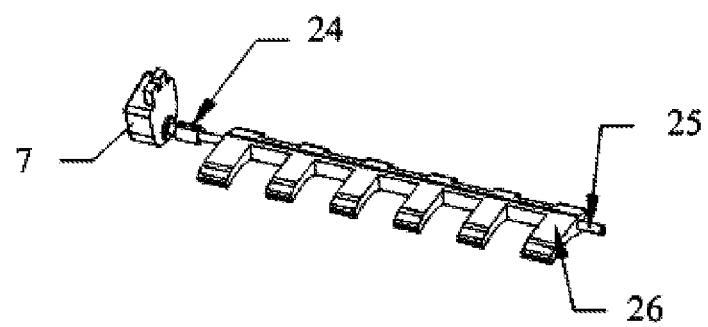
FIG. 9 is a schematic view showing the structure of a reversing mechanism in the self-adaptive scanning device.

As shown in FIGS. 8, 9, and 11, the rotational electromagnet 7 and the reversing spindle 25 are fixedly connected together by the coupling 24, and the rotational electromagnet 7 is mounted on the left side plate 5 or the right side plate 9, and the reversing component 26 is fixedly mounted to the reversing spindle 25. The reversing component 26 is driven to rotate by the rotation of the rotational electromagnet 7. The reversing component 26, after rotating to move upward, meshes with vacant slots 33 mated with the reversing component 26 in the upper passage plate 23, and the joining passage 15 between the reversing component 26 and the lower passage plate 11 is formed. After the reversing component 26 is rotated to move downward, a front end thereof abuts against the lower passage plate 11, in such a case, a recovering passage 16 between the reversing component 26 and the upper passage plate 23 is formed.

Figure 4:
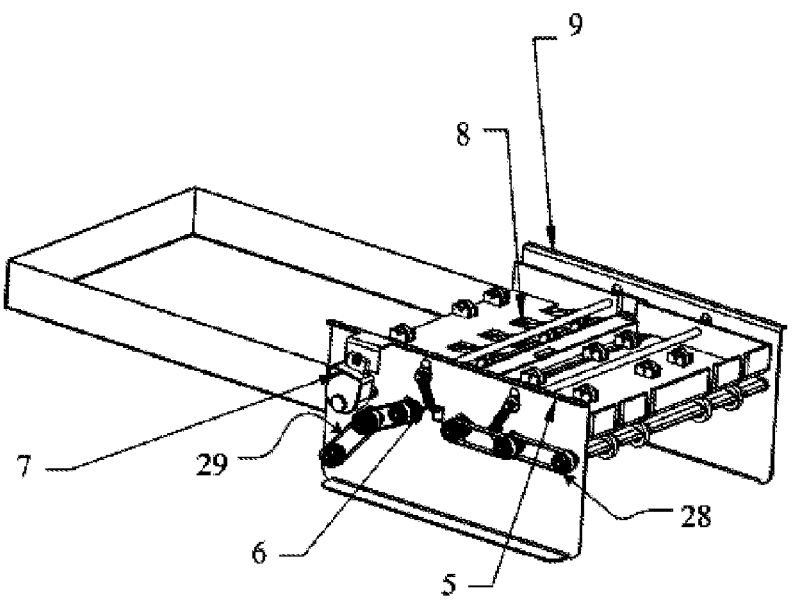
FIGS. 4, 5, 6, 7 are schematic views showing the structure of the self-adaptive scanning device with the upper cover of the housing and a lower cover of the housing being concealed.
Figure 5:
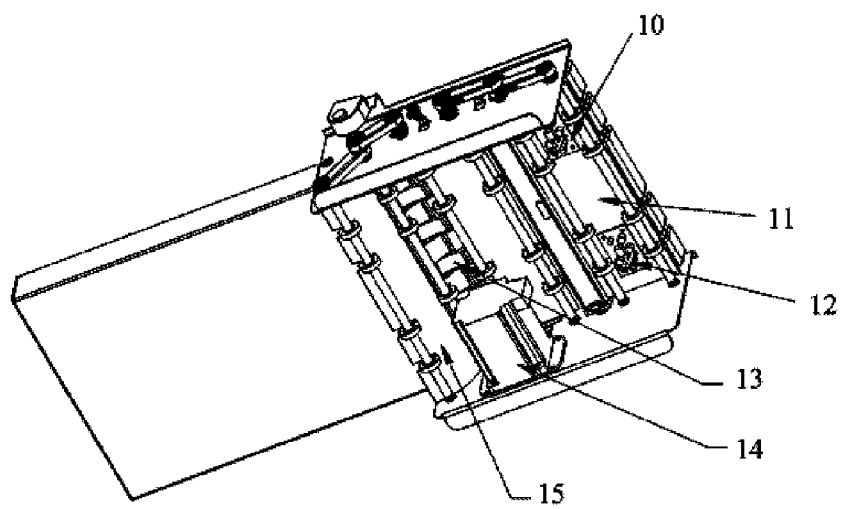
Figure 6:
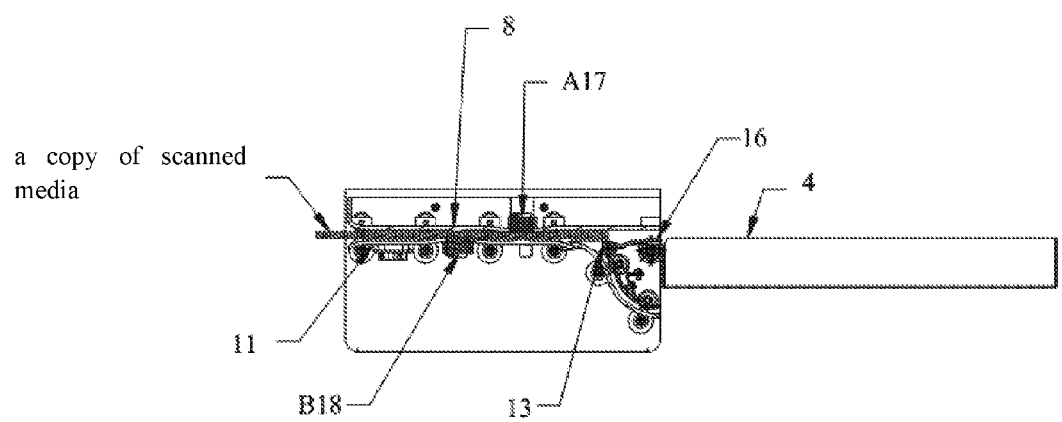

As shown in FIGS. 4, 6, and 7, a plurality of transmission shafts 27, passing through axes of the friction wheels 22 respectively, are installed between the left side plate 5 and the right side plate 9. The driving wheel 28 is fixedly mounted at one end of the transmission shaft 27, and is located on an outer side of the left side plate 5 or the right side plate 9. The caterpillar band 29 is mounted around a plurality of the driving wheels 28, and is configured to drive the driving wheels 28 to rotate synchronously. The driving motor 14 is installed on the left side plate 5 or the right side plate 9, and the driving motor 14 is provided with an output wheel. The output wheel is connected to the driving wheels 28 via the caterpillar band 29, and the driving motor 14 drives the plurality of the driving wheels 28 via the output wheel and the caterpillar band 29 to rotate. It should be understood that, the transmission shafts 27, the driving wheels 28, the caterpillar band 29 and the driving motor 14 constitute a power assembly of the self-adaptive scanning device and the power assembly may be configured to drive the friction wheels 22 to rotate synchronously, thus may convey the scanned medium entered. However, the constitution of the power assembly is not fixed, and may also adopt other power combinations, which is not limited here.

Figure 1:
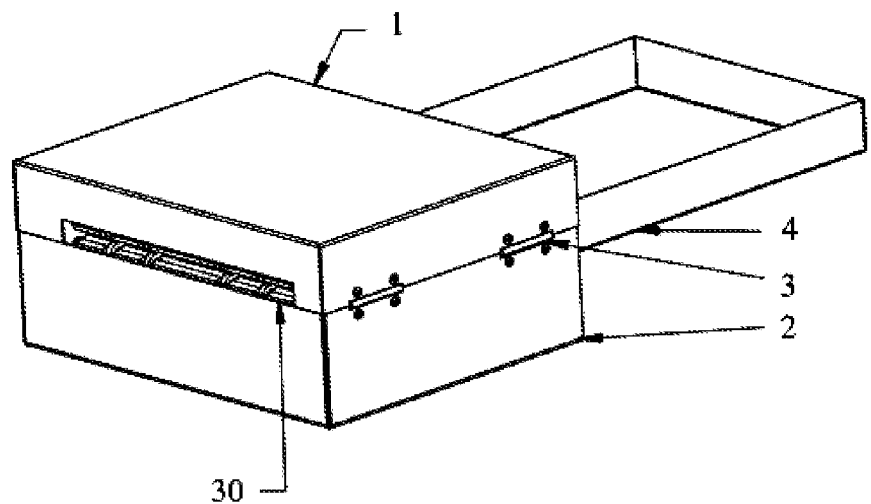
FIGS. 1 and 2 are schematic views showing the structure of a self-adaptive scanning device according to the present application with a housing of which being closed.
Figure 2:
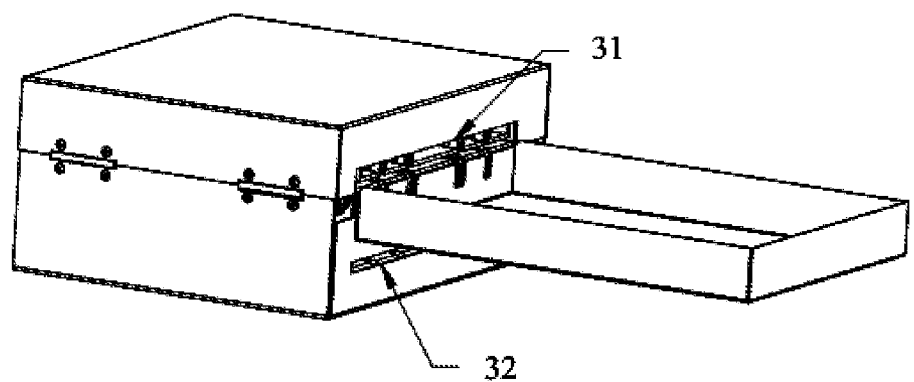
Figure 3:
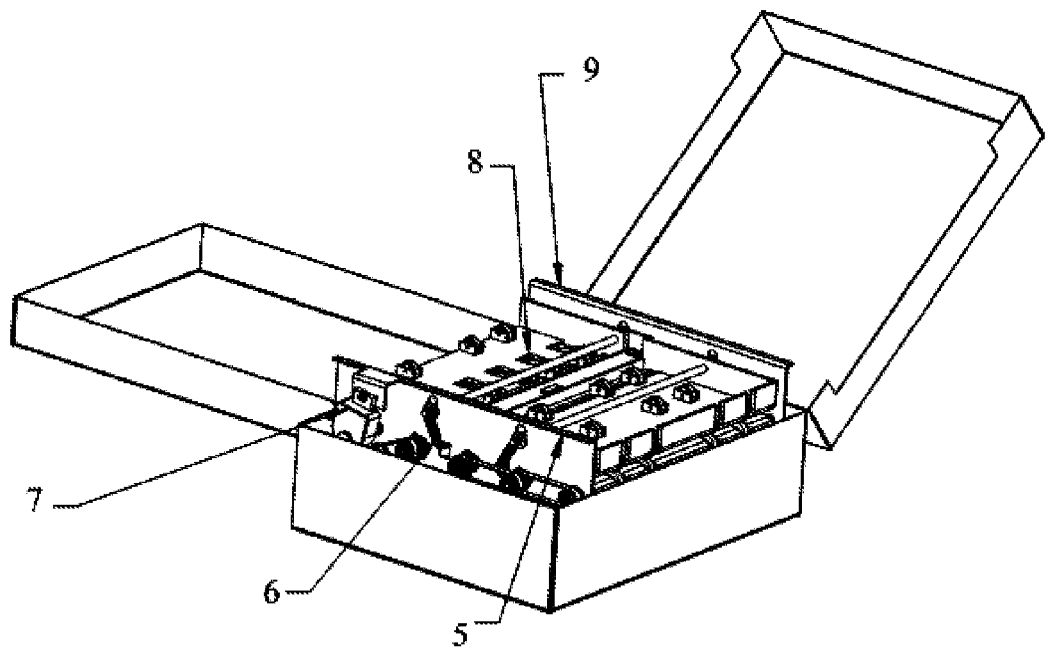
FIG. 3 is a schematic view showing the structure of the self-adaptive scanning device with an upper cover of the housing being opened.

As shown in FIGS. 1 and 2, the upper cover of housing 1 and the lower cover of housing 2 are movably connected via the hinge 3, and together encapsulate the self-adaptive scanning device. The recovery box 4 is mounted at an exit of the recovering passage 16. It may be understood that, the upper cover of housing 1 and the lower cover of housing 2 and even the connection method of the linkage 3 shown in FIGS. 1 and 2 may be achieved in other manners, for example, the linkage 3 may be replaced by mounting screws, and the case upper cover 1 and the case lower cover 2 may be integrally formed, without requiring to be separated, etc.

Optionally, when the scanned medium enters the scanning passage 34, the upper passage plate 23 slides and moves upward under the action of a supporting force of the scanned medium, thus the scanned medium may enter the scanning passage 34. The upper passage plate 23 slides downward under the action of a restoring force provided by the tension spring 6, and closely fits the scanned medium, to allow a sensing surface of the image scanning tube A17 on the upper passage plate 23 and a sensing surface of the image scanning tube B18 on the lower passage plate 11 to closely fit an upper surface and a lower surface of the scanned medium.

Optionally, the scanned medium, after entering via the entrance of the scanning passage 34, passes through the scanning passage 34 and enters the recovering passage 16, and finally enters the recovery box 4 via the exit 31 of the recovering passage 16, and during this period, the image scanning tube A17 scans the scanned medium, or the image scanning tube B18 scans the scanned medium, or the card-type information reading assembly 10 reads related information of the scanned medium, or the certificate information reading assembly 12 reads related information of the scanned medium.

Optionally, when the scanned medium enters via the entrance 32 of the joining passage 15, the reversing mechanism moves upward, and the scanned medium passes through the joining passage 15 and enters the scanning passage 34, and finally comes out via the entrance 30 of the scanning passage 34.

The self-adaptive scanning device according to this embodiment has multiple kinds of functions and usages, which will be separately described hereinafter.

1) The Self-Adaptive Function for the Scanned Media with Different Thicknesses is Achieved by the Following Way:

As shown in FIGS. 7 and 8, the upper passage fixed shaft 20 is fixed to the upper passage plate 23, the shaft sleeves 19 are sleeved on the upper passage fixed shaft 20. As shown in FIG. 11, the shaft sleeves 19 may slide upward and downward in the guide slot 33 of the left side plate 5 and the guide slot 33 of the right side plate 9 respectively, the tension spring 6 has one end fixed to the upper passage fixed shaft 20 and has another end fixed to the left side plate 5 or the right side plate 9. As shown in FIG. 11, after the scanned media with different thicknesses enter the passage, the upper passage plate 23 of the upper floating passage assembly 8 may drive the upper passage fixed shaft 20 and the shaft sleeves 19 to slide upward in the guide slots 33 of the left side plate 5 and the right side plate 9, thus the upper passage plate 23 also moves upward, and the scanning passage 34 is widened. At this moment, the tension spring 6 may provide a downward restoring force to the upper floating passage assembly 8, thus allowing the scanning passage 34 to be adaptively adjusted to be applicable to the scanned media with different thicknesses, thereby achieving the self-adaptive function to the scanned media with different thicknesses, which allows the self-adaptive scanning device to automatically adjust a height of the scanning passage 34 according to thicknesses of the various scanned media, to allow the scanning passage 34 to reach an optimum state of conveying and scanning.

2) The Reversing Mechanism is Operated in the Following Manner.

Figure 14:
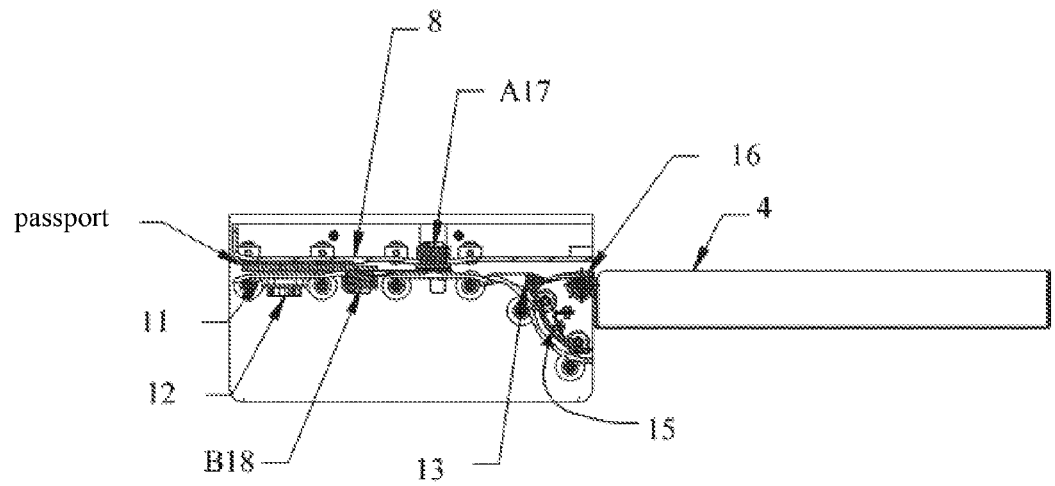
FIG. 14 is a schematic view showing that the self-adaptive scanning device scans and recovers a passport.
Figure 15:
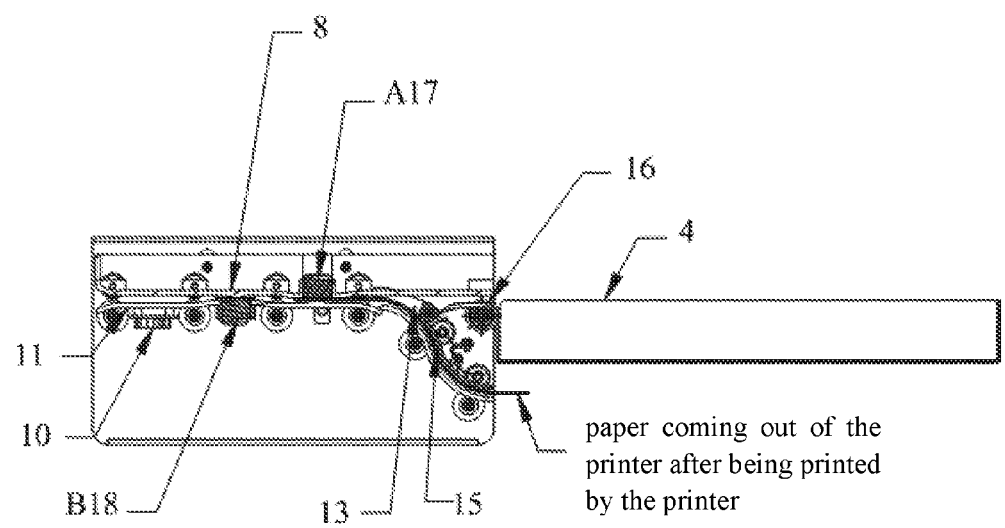
FIG. 15 is a schematic view showing that the self-adaptive scanning device conveys paper coming out of a printer after being printed by the printer and scans an image of the paper to acquire information.

As shown in FIG. 4, the rotational electromagnet 7 is fixed to the left side plate 5, as shown in FIG. 9, the rotational electromagnet 7 is connected to the reversing spindle 25 by the coupling 24, and the reversing component 26 is fixed to the reversing spindle 25. When rotates, the rotational electromagnet 7 may drive the reversing component 26 to rotate, thus may achieve the reversing function of the reversing mechanism 13. Referring to FIG. 14, when the rotational electromagnet 7 drives the reversing component 26 to rotate counterclockwise, the reversing component 26 blocks the joining passage 15 and opens the recovering passage 16. Referring to FIG. 15, and when the rotational electromagnet 7 drives the reversing component 26 to rotate clockwise, a front end of the reversing component 26 cocks upward and cooperates with the upper passage plate 23 to block the recovering passage 16 and open the joining passage 15. Thus, the reversing mechanism 13 may switch the state of "paper feeding, scanning and recovering passage" or the state of "the passage for printed medium delivered" according to the requirements.

3) The Passage for Printed Medium Delivered is Operated in the Following Manner.

As shown in FIG. 15, the reversing mechanism 13 switches to the state of the "the passage for printed medium delivered", at this moment, the paper coming out of the printer after being printed by the printer may be guided into the joining passage 15 via the entrance 32 of the joining passage, and then passes through the reversing mechanism 13 and reaches the scanning area, at this moment, the image of a single side or double sides of the paper may be scanned and the information of a single side or double sides of the paper may be acquired for by the image scanning tube A17, the image scanning tube B18, and is finally returned to the customer via the entrance 30 of the scanning passage 34.

4) The Self-Adaptive Scanning Device May Convey, Scan, and Recover a Single Layer Paper Type Scanned Medium in the Following Way.

Figure 12:
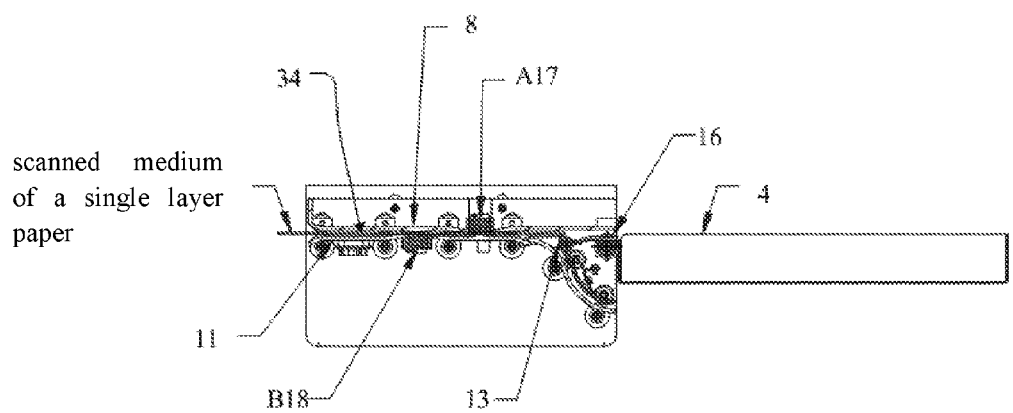
FIG. 12 is a schematic view showing that the self-adaptive scanning device scans and recovers a scanned medium of a single layer paper.

As shown in FIGS. 1, 2, and 12, the single layer paper type scanned medium enters via the entrance 30 of the scanning passage 34, and at this moment, the self-adaptive scanning device may automatically adjust the height of the scanning passage 34 according to the thickness of the single layer paper type scanned medium, to allow the passage to reach an optimum state of conveying and scanning, and at the same time, the reversing mechanism 13 may switch to the state of "paper feeding, scanning, recovering passage". Then the single layer paper type scanned medium is conveyed into the scanning passage 34, to allow an image of a single side or double sides of the scanned medium and information of a single side or double sides of the medium to be acquired by the image scanning tube A17 and the image scanning tube B18, and then the single layer paper type scanned medium passes through the reversing mechanism 13, and the recovering passage 16, and finally passes through the exit 3131 of the recovering passage and enters the recovery box 4.

5) The Self-Adaptive Scanning Device Conveys the Card-Type Medium in the Passage, Scans the Card-Type Medium, and Reads the Information in the Card-Type Medium by a Card Reader in Ways as Follows.

Figure 13:
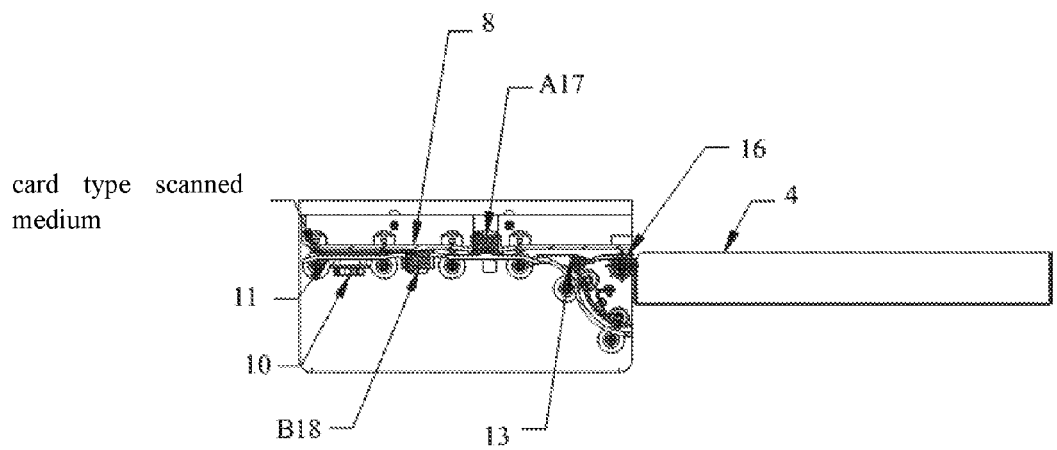
FIG. 13 is a schematic view showing that the self-adaptive scanning device scans and recovers a card-type scanned medium.

As shown in FIGS. 1, 2, 13, the card-type medium enters via the entrance 30 of the scanning passage 34, and at this moment, the self-adaptive scanning device may automatically adjust a height of the passage according to a thickness of the card-type medium, to allow the passage to achieve an optimum state of conveying and scanning, and at the same time, the reversing mechanism 13 may switch to the state of "paper feeding, scanning, recovering passage". Then the card-type medium is conveyed into the scanning passage 34, and the information in the card is read by the card-type information reading assembly 10, and then the card-type medium is continually conveyed, to allow an image of a single side or two sides of the card-type scanned medium and information of a single side or two sides of the card-type medium to be acquired by the image scanning tube A17 and the image scanning tube B18, and then the card is returned, and the card-type medium is returned to the customer through the entrance 30 of the scanning passage 34.

6) The Self-Adaptive Scanning Device May Convey a Copy of Scanned Media in the Passage and Scan a Copy of Scanned Media in the Way as Follows.

Figure 10:
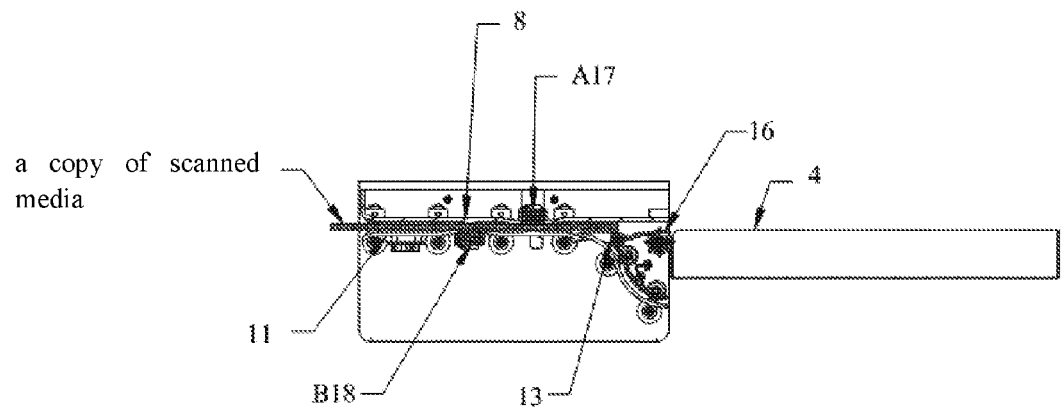
FIG. 10 is a schematic view showing that the self-adaptive scanning device scans and recovers a copy of scanned media.

As shown in FIGS. 1, 2, and 10, a copy of the scanned media may enter via the entrance 30 of the scanning passage 34, and at this moment, the self-adaptive scanning device may automatically adjust a height of the passage according to a thickness of a copy of the scanned media, to allow the passage to achieve an optimum state of conveying and scanning, and at the same time, the reversing mechanism 13 switches to the state of "paper feeding, scanning, recovering passage". Then a copy of the scanned media is conveyed into the scanning passage 34, to allow an image of a single side or both sides of a copy of the scanned media and information of a single side or both sides of a copy of the media to be acquired by the image scanning tube A17 and the image scanning tube B18, and then the media are returned, and a copy of the scanned media is returned to the customer through the entrance 30 of the scanning passage 34.

7) The Self-Adaptive Scanning Device May Convey a Passport in the Passage and Scan the Passport and Read Information in the Passport by a Card Reader in the Way as Follows.

As shown in FIGS. 1, 2, and 14, the passport enters via the entrance 30 of the scanning passage 34, and at this moment, the self-adaptive scanning device may automatically adjust a height of the passage according to a thickness of the passport, to allow the passage to achieve an optimum state of conveying and scanning, and at the same time, the reversing mechanism 13 switches to the state of a "paper feeding, scanning, recovering passage". Then the device may convey the passport into the scanning passage 34, and the information in the passport is read by the certificate information reading assembly 12, and since the thicknesses of the passports are different, an image of the passport is scanned and the information of the passport is acquired only by the image scanning tube B18 when the passport is scanned. After the information of the passport is acquired, the self-adaptive scanning device may withdraw the passport, and return the passport to the customer through the entrance 30 of the scanning passage 34.

For facilitating understanding, a self-adaptive scanning device according to the present application is described in a practical application scenario.

A virtual teller machine (VTM) is a self-service terminal device integrating various kinds of counter services of the bank and replacing the traditional counter services with the way of user self-service and remote teller assistance. The teller assists the customer at a front end of the VTM by the remote service to perform the operation, to replace the business operation of an ordinary teller at a counter. This kind of highly integrated and highly self-service business requires the customer to provide various scanned media, identification certificate or signature document and retained image, etc. The self-adaptive scanning device according to this embodiment may meet these requirements.

Assuming that, the customer is required to provide four kinds of scanned media including an identification card, a household registry certificate, a bank card, and a signature document paper. The process of the customer performing related operations to these documents through the self-adaptive scanning device is described hereinafter.

1. The identification card is disposed into the self-adaptive scanning device via the entrance 30 of the scanning passage 34, and the self-adaptive scanning device reads related information of the identification card, and scans images of a front side and a back side of the identification card, and then transmits the images scanned to a remote teller via network. After this finishes, the identification card is withdrawn from the entrance 30 of the scanning passage 34.

2. The household registry certificate is disposed into the self-adaptive scanning device via the entrance 30 of the scanning passage 34, and the self-adaptive scanning device reads related information of the household registry certificate, and scans images of a front side and a back side of the household registry certificate, and then transmits the scanned images to the remote teller via network. After this finishes, the household registry certificate is withdrawn from the entrance 30 of the scanning passage 34.

3. The bank card is disposed into the self-adaptive scanning device via the entrance 30 of the scanning passage 34, and the self-adaptive scanning device reads related information of the bank card, and scans images of a front side and a back side of the bank card, and then transmits the images scanned to the remote teller via network. After this finishes, the bank card is withdrawn from the entrance 30 of the scanning passage 34.

4. For signature paper document required to be archived, the signature document paper is disposed into the self-adaptive scanning device via the entrance 30 of the scanning passage 34, and the self-adaptive scanning device scans images of a front side and a back side of the signature document paper, and then transmits the images scanned to the remote teller via network. After this finishes, the signature document paper is withdrawn from the exit 31 of the recovering passage 16, and enters the recovery box 4.

5. For a signature document paper which is not required to be archived and is faxed by the remote teller, the signature document paper is disposed into the self-adaptive scanning device via the entrance 32 of the joining passages 15, the self-adaptive scanning device scans images of a front side and a back side of the signature document paper, and then transmits the images of the front side and the back side to the remote teller or retained them in the VTM. After this finishes, the signature document paper is withdrawn from the entrance 30 of the scanning passage 34.

The above five steps are only limited examples for practical applications of the self-adaptive scanning device, and the self-adaptive scanning device further has lots of usage modes and application scenarios, which are not described detail hereinafter.

It can be clearly understood by those skilled in the art that, for convenience and concision of the description, the specific operating process of the system, device and unit described above may refer to the corresponding process in the embodiment of the method described above, which will not be described herein again.

In the several embodiments of the present application, it should be appreciated that, the system, the device and the method disclosed herein may be implemented in other manners. For example, the embodiments of the device described above are only schematic. For example, the division of the units is only a division according to logical function, and there may be other division modes in the practical implementation, for instance, multiple units or components may be combined, or may be integrated into another system; and some features may be omitted or may not be performed. In addition, the coupling between the components, direct coupling or communication connection displayed or discussed above may be realized by some interfaces, or indirect coupling or communication connection of devices or units, and may be electrical, mechanical or of other forms.

The above unit described as a separate component may be or may be not physically separate. The component displayed as a unit may be or may be not a physical unit, that is, may be located at one place or may be distributed on multiple network units. The object of the solution of the embodiment may be achieved by selecting a part or all of the units according to the actual requirements.

Furthermore, various function units in the embodiments of the present application may be integrated in one processing unit; or each of the function units may exist in a single physical unit; or two or more function units are integrated in one unit. The above integrated unit may be realized in the form of hardware or in the form of software function unit.

In the case that the integrated unit is implemented in the form of software function unit and is sold or used as a separate product, it can also be stored in a computer readable storage medium. Based on such understanding, the essence, or the part that contributes to the conventional technology of the technical solutions of the present application, or, a part or whole of the technical solutions may be embodied in the form of a software product. The computer software product is stored in a storage medium, and includes several instructions configured to allow a computer device (which may be a personal computer, a server, or a network device, and etc.) to execute all or part of the steps of the method of each embodiment of the present application. The storage medium described above includes various media capable of storing program codes, such as a USB flash disk, a movable hard disk, a Read-Only Memory (ROM), a Random Access Memory (RAM), a magnetic disc or an optical disc.

The above description and the above embodiments are only intended to illustrate the technical solutions of the present application, and should not be interpreted as a limitation to the technical solutions of the present application. Though the present application has been described in detail with reference to the above embodiments, it should be understood by those skilled in the art that, modifications may be made to the technical solutions described in the various embodiments described above, or equivalent substitutions may be made to a part of the technical features in the above embodiments; and all these modifications or substitutions may not make the essence of the respective technical solutions depart from the spirit and scope of the technical solutions of the embodiments of the present application.

What is claimed is:

1. A self-adaptive scanning device, comprising:
   a left side plate, a right side plate, a tension spring, an upper floating passage assembly, an image scanning tube B, a lower passage plate, a card-type information reading assembly, a certificate information reading assembly, friction wheels, and shaft sleeves, wherein
   the upper floating passage assembly comprises an image scanning tube A, an upper passage plate, an upper passage fixed shaft, and fixed bearings;
   the upper passage fixed shaft is fixed to the upper passage plate, and is mounted between the left side plat and the right side plate;
   the left side plate and the right side plate are each provided with a guide slot, and each of the shaft sleeves is movably mounted in the corresponding guide slot and slides upward and downward along the respective guide slot, and two ends of the upper passage fixed shaft are fixed to the shaft sleeves respectively;
   a plurality of fixed bearings are mounted on the upper passage plate, and a plurality of friction wheels are mounted on the lower passage plate, and the fixed bearings and the friction wheels are arranged in pairs;
   a scanning passage between the upper passage plate and the lower passage plate is formed;
   the image scanning tube A is mounted above the scanning passage, and the image scanning tube B is mounted below the scanning passage;
   the tension spring has one end fixed to the upper passage fixed shaft, and another end fixed to the left side plate or the right side plate;
   the card-type information reading assembly is mounted on the upper passage plate or the lower passage plate, and is configured to read a built-in card information of a card type scanned medium in the scanning passage; and
   the certificate information reading assembly is mounted on the upper passage plate or the lower passage plate, and is configured to read a built-in certificate information of a certificate type scanned medium in the scanning passage.

2. The self-adaptive scanning device according to claim 1, further comprising a reversing mechanism, wherein
   the reversing mechanism comprises a rotational electromagnet, a coupling, a reversing spindle, and a reversing component;
   the rotational electromagnet and the reversing spindle are fixedly connected together by the coupling;
   the rotational electromagnet is mounted on the left side plate or the right side plate; and
   the reversing component is fixedly mounted on the reversing spindle.

3. The self-adaptive scanning device according to claim 2, wherein
   the reversing component is driven to rotate by the rotation of the rotational electromagnet, and the reversing component, after being rotated to move upward, meshes with a vacant slot mated with the reversing component in the upper passage plate, and a joining passage between the reversing component and the lower passage plate is formed; and
   after the reversing component rotates to move downward, a front end of the reversing component abuts against the lower passage plate, and a recovering passage between the reversing component and the upper passage plate is formed.

4. The self-adaptive scanning device according to claim 1, wherein the self-adaptive scanning device further comprises:
   a plurality of transmission shafts passing through axes of the friction wheels respectively and mounted between the left side plate and the right side plate, with each being configured to drive the friction wheels on the transmission shaft to rotate together.

5. The self-adaptive scanning device according to claim 4, wherein the self-adaptive scanning device further comprises:
   a driving wheel fixedly mounted at one end of each of the transmission shafts and located on an outer side of the left side plate or the right side plate;
   a caterpillar band, mounted around a plurality of driving wheels, and configured to drive the driving wheels to synchronously rotate; and
   a driving motor, mounted to the left side plate or the right side plate, wherein the driving motor is provided with output wheels, the output wheels are connected to the driving wheels by the caterpillar band, and the driving motor drives the plurality of driving wheels to rotate via the output wheels and the caterpillar band.

6. The self-adaptive scanning device according to claim 1, further comprising: an upper cover of housing and a lower cover of housing matching with the upper cover of housing, wherein, the upper cover of housing and the lower cover of housing are movably connected by a hinge; and the self-adaptive scanning device is housed by the upper cover of housing and the lower cover of housing together.

7. The self-adaptive scanning device according to claim 3, further comprising a recovery box, wherein the recovery box is mounted at an exit of the recovering passage, and is configured to recover the scanned medium coming out from the recovering passage.

8. The self-adaptive scanning device according to claim 1, wherein when the scanned medium enters the scanning passage, the upper passage plate slides to move upward under the action of a supporting force of the scanned medium, and the scanned medium enters the scanning passage; and the upper passage plate slides downward under the action of a restoring force provided by the tension spring and closely fits the scanned medium, to allow a sensing surface of the image scanning tube A on the upper passage plate and a sensing surface of the image scanning tube B on the lower passage plate to fit an upper surface and a lower surface of the scanned medium respectively.

9. The self-adaptive scanning device according to claim 7, wherein the scanned medium, after entering via an entrance of the scanning passage, passes through the scanning passage to enter the recovering passage, and finally enters the recovery box via an exit of the recovering passage, during this period, the image scanning tube A scans the scanned medium, or the image scanning tube B scans the scanned medium, or the card-type information reading assembly reads related information of the scanned medium, or the certificate information reading assembly reads related information of the scanned medium.

10. The self-adaptive scanning device according to claim 7, wherein when the scanned medium enters via an entrance of the joining passage, the reversing mechanism moves upward, and the scanned medium passes through the joining passage to enter the scanning passage, and finally comes out via the entrance of the scanning passage.

\* \* \* \* \*